(12) United States Patent  (10) Patent No.: US 8,103,728 B2
Johnson  (45) Date of Patent: Jan. 24, 2012

(54) DATABASE SYNCHRONIZATION ON A NETWORK

(75) Inventor: Glen Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/051,933

(22) Filed: Mar. 20, 2008

(65) Prior Publication Data

US 2008/0215761 A1  Sep. 4, 2008

Related U.S. Application Data

(63) Continuation of application No. 10/880,260, filed on Jun. 29, 2004, now abandoned.

(51) Int. Cl.
*G06F 15/16* (2006.01)
(52) U.S. Cl. ............... 709/206; 709/207; 707/609
(58) Field of Classification Search ........... 709/201–207
See application file for complete search history.

(56) References Cited

U.S. PATENT DOCUMENTS

| | | | | |
|---|---|---|---|---|
| 5,793,861 | A * | 8/1998 | Haigh | 379/265.09 |
| 6,021,202 | A * | 2/2000 | Anderson et al. | 705/54 |
| 6,640,244 | B1 * | 10/2003 | Bowman-Amuah | 709/207 |
| 6,882,994 | B2 * | 4/2005 | Yoshimura et al. | 707/3 |
| 7,243,163 | B1 * | 7/2007 | Friend et al. | 709/248 |
| 7,293,081 | B2 * | 11/2007 | Motoyama et al. | 709/223 |
| 2002/0091775 | A1 * | 7/2002 | Morehead et al. | 709/206 |
| 2002/0116467 | A1 * | 8/2002 | Boyer et al. | 709/206 |
| 2003/0097358 | A1 * | 5/2003 | Mendez | 707/3 |
| 2003/0101227 | A1 * | 5/2003 | Fink | 709/207 |
| 2003/0212690 | A1 * | 11/2003 | Surma et al. | 707/100 |
| 2003/0231207 | A1 | 12/2003 | Huang | |
| 2004/0148303 | A1 | 7/2004 | McKay et al. | |
| 2004/0177120 | A1 * | 9/2004 | Kirsch | 709/206 |
| 2004/0177319 | A1 * | 9/2004 | Horn | 715/501.1 |
| 2005/0165752 | A1 * | 7/2005 | Mathew et al. | 707/3 |
| 2005/0278428 | A1 * | 12/2005 | Motoyama et al. | 709/206 |
| 2007/0274291 | A1 * | 11/2007 | Diomelli | 370/352 |
| 2008/0021921 | A1 | 1/2008 | Horn | |

FOREIGN PATENT DOCUMENTS

JP  2001125838 A  *  5/2001

OTHER PUBLICATIONS

"Communication Method with Applications by Natural Language." IBM Technical Disclosure Bulletin. Oct. 1, 1988. vol. 31, Issue 5, 443-445.*
Applicant's attorney James Nickelson, Preliminary Amendment for U.S. Appl. No. 10/880,260 (Assignee's abandoned parent application), Mar. 18, 2008, Austin, TX, USA.

(Continued)

*Primary Examiner* — Jeffrey R Swearingen
(74) *Attorney, Agent, or Firm* — Stephen J. Walder, Jr.; Matthew B. Talpis

(57) ABSTRACT

Systems, methods and media for database synchronization on a network are disclosed. More particularly, hardware and/or software for database synchronization on a network protected with firewalls are disclosed. Embodiments include an e-mail listener for receiving e-mails from a plurality of computer systems and modifying a central database based on the received e-mails. In one embodiment, the computers systems and central database are protected by a firewall. Other embodiments provide for a transaction log that includes information about received e-mails. In these embodiments, the transaction log may optionally be used to synchronize other databases, including local databases located at the computer systems.

17 Claims, 7 Drawing Sheets

OTHER PUBLICATIONS

Non-Final Office Action for U.S. Appl. No. 10/880,260 (Assignee's abandoned parent application), Mar. 25, 2008, USPTO, Alexandria, VA, USA.

Telephone Interview Summary for U.S. Appl. No. 10/880,260 (Assignee's abandoned parent application), Jun. 8, 2008, USPTO, Alexandria, VA, USA.

Applicant's attorney James Nickelson, Response to Non-Final Office Action for U.S. Appl. No. 10/880,260 (Assignee's abandoned parent application), Jun. 19, 2008, Austin, TX, USA.

Final Office Action for U.S. Appl. No. 10/880,260 (Assignee's abandoned parent application), Aug. 29, 2008, USPTO, Alexandria, VA, USA.

Applicant's attorney James Nickelson, Appeal Brief for U.S. Appl. No. 10/880,260 (Assignee's abandoned parent application), Jan. 26, 2009, Austin, TX, USA.

Notice of Allowance for U.S. Appl. No. 10/880,260 (Assignee's abandoned parent application), Apr. 17, 2009, USPTO, Alexandria, VA, USA.

\* cited by examiner

DATABASE SYNCHRONIZATION ON A NETWORK

CROSS-REFERENCES TO RELATED APPLICATIONS

Pursuant to 35 USC §120, this continuation application claims priority to and benefit of U.S. patent application Ser. No. 10/880,260, entitled "SYSTEMS, METHODS, AND MEDIA FOR DATABASE SYCHRONIZATION ON A NETWORK", filed on Jun. 29, 2004 now abandoned, the disclosure of which is incorporated herein in its entirety for all purposes.

FIELD OF INVENTION

The present invention is in the field of computer systems. More particularly, the present invention relates to systems, methods and media for synchronizing a database based on input from a plurality of computer systems where the database and/or the computer systems may be located behind a firewall.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output-system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

The widespread use of PCs to various segments of society has resulted in a reliance on the PCs for work, e.g., telecommuting, news, stock market information and trading, banking, shopping, shipping, communication in the form of hypertext transfer protocol (http) and email, as well as other services. Many of these functions take advantage of the Internet. With PCs being increasingly connected into networks to allow transfers of data among computers to occur, more operations such as maintenance, updating of applications, workplace collaboration, and data collection are occurring over the network.

While many businesses allow their employees to access the Internet from company computers because of the immense benefits in communication, productivity, knowledge, etc. that may be achieved, such value comes at a cost. Proper functioning of a company's computer system and protection of the company's proprietary information require that a prudent company provide network security to deter hackers, minimize damage from computer viruses, and to keep company information proprietary. Network security typically includes a hardware and/or software firewall to protect the company's computer systems from attackers or other unwanted intruders from the outside. A firewall can also serve to prevent users of the computer system (i.e., employees) from accessing particular websites, from transmitting certain types or sizes of files, etc. Most companies do opt to limit their employees' access to outside networks, such as access to other companies' networks, because of the network security risks, despite the value that the employees could gain from having such access. Most of these companies do, however, allow e-mail to and from outside sources (and through the firewall) as it has great value and the risks associated with it are more easily managed.

The proliferation of PCs and other computer systems in the business world—as well as the advent of networks such as Local Area Networks (LANs) and corporate intranets—has resulted in the creation and utilization of computer software-based tools which facilitate dissemination of information and collaboration between employees. One common use of the computer software-based tools is facilitating business process improvement. These business processes can often be represented as a workflow characterized by a well-defined succession of states. A relational database is often used to represent and store this transactional data in such a system. The current trend in, workflow software centers around a relational database engine with access provided by a web browser-enabled interface on a corporate intranet. Such tools do not presently have the capability for flow and synchronization between discrete corporate organizations, at least partially based on network security concerns.

As companies increasingly enter into joint ventures, subcontractor, joint development, standards setting, or other collaborative arrangements, the need has arisen to facilitate dissemination of information between the employees of different companies, similar to the company-internal dissemination and collaboration that has been occurring for years, such as by the intranet-based relational database engines. Corporate firewalls installed to improve network security, however, prevent easy sharing of computer systems and information when the employees are from multiple companies. This problem is exacerbated with relational databases, since access to a central database by employees of multiple companies is often impossible or undesirable and the organizational benefits of a relational database cannot be achieved, as the relational database is usually located behind one of the corporate firewalls.

There is, therefore, a need for an effective, safe and efficient system to facilitate synchronization of information among the personnel on different computer systems, such as those maintained by individual companies. There is an even greater need for such a system when the different computer systems are protected by firewalls or other network security.

SUMMARY OF THE INVENTION

The problems identified above are in large part addressed by systems, methods and media for synchronizing a database on a network. One embodiment provides a system that includes a plurality of computer systems in communication with a network. The computer systems may be protected with a firewall. The system may also provide a database and an e-mail listener in communication with the network. The e-mail listener may receive e-mails transmitted from the computer systems via the network, and may then update the database based on the received e-mail.

Another embodiment provides a method for synchronizing a database on a network. The method generally includes modifying a recording in a database, creating a transactional e-mail including an indication of the modified record, and transmitting the transaction e-mail. The method also generally includes receiving the transaction e-mail, analyzing the transaction e-mail, and modifying a database based on the analysis of the transaction e-mail.

Another embodiment provides a method for synchronizing a database on a network. The method generally includes receiving a transaction e-mail via the network, where the transaction e-mail includes information relating to an update to the database. The method further may include analyzing the transaction e-mail to determine the update to the database and modifying the database accordingly. The method may also include updating a transaction log based on the analysis of the transaction e-mail. In one embodiment, the method further includes transmitting the updated transaction log.

Another embodiment provides a machine-accessible medium containing instructions effective, when executing in a data processing system, to cause the system to perform a series of operations for synchronizing a database on a network. The series of operations generally includes receiving a transaction e-mail via the network, where the transaction e-mail includes information relating to an update to the database. The series of operations may further include analyzing the transaction e-mail to determine the update to the database and modifying the database accordingly, as well as updating a transaction log based on the analysis of the transaction e-mail.

A further embodiment provides an apparatus for synchronizing a database on a network. The e-mail listener system may include a receiving module adapted to receive a transaction e-mail from one of a plurality of computer systems via a network. The e-mail listener may further include an analysis module adapted to analyze the received transaction e-mail to determine an update to the database, as well as an update module to update the database based on the results of the analysis of the received transaction e-mail.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods and media for database synchronization on a network are disclosed. More particularly, hardware and/or software components for database synchronization on a network protected with firewalls are disclosed. Embodiments include an e-mail listener for receiving e-mails from a plurality of computer systems and modifying a database based on the received e-mails. In one embodiment, the computers systems and database are protected by a firewall. Other embodiments provide for updating a transaction log that includes information about received e-mails. In these embodiments the transaction log may be used to synchronize other databases.

In several embodiments, one or more computer systems may include a local database that is related to the central database. Users may input changes to a local database and a transaction e-mail including information about those changes may be transmitted to the e-mail listener. The e-mail listener receives transaction e-mails from the various computer systems and updates the central database. A transaction log may be created based on the updates, and this transaction log may be used to create a backup database, saved as a form of backup, or it may be transmitted to the computer systems. The computer systems may then allow updates of the local database based on the received transaction log, allowing for synchronization of the local databases with the central database. Because e-mail is used to transmit information between the e-mail listener and the computer systems, problems with network security are advantageously avoided.

While specific embodiments will be described below with reference to particular configurations of hardware and/or software, those of skill in the art will realize that embodiments of the present invention may advantageously be implemented with other substantially equivalent hardware and/or software systems.

Figure 1:
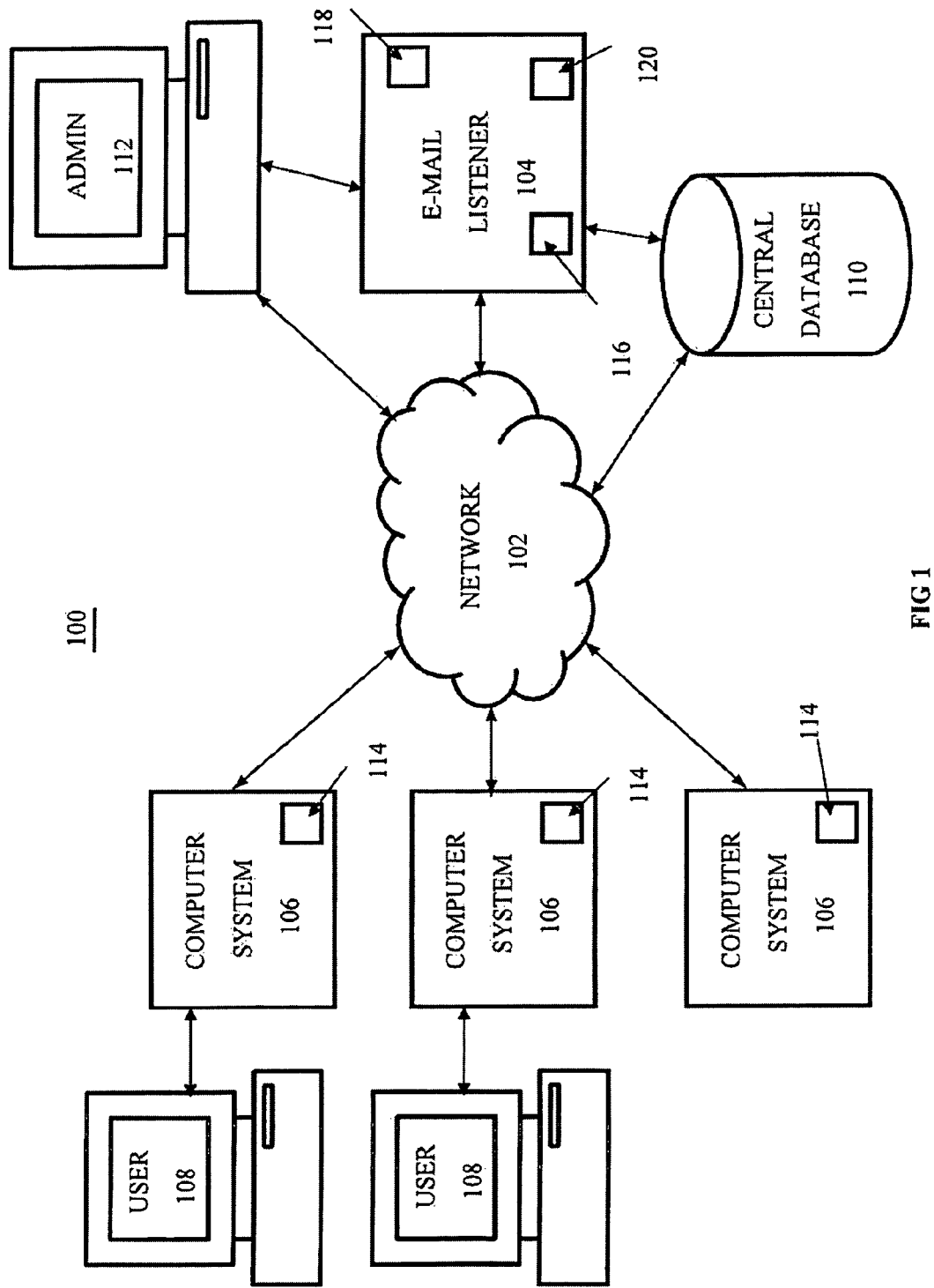
FIG. 1 depicts an environment for a system for synchronizing a database on a network according to one embodiment.

Turning now to the drawings, FIG. 1 depicts an environment for a system 100 for synchronizing a database on a network according to one embodiment. In the depicted embodiment, system 100 includes a plurality of computer systems 106 in communication with a network 102. Each computer system 106 may be in communication with one or more user computers 108. System 100 also includes an e-mail listener 104 in communication with network 102 for receiving e-mails from computer systems 106 via the network 102. In one embodiment, at least some of the computer systems 106 are remote from the e-mail listener 104. Central database 110 may be in communication with e-mail listener 104 and/or network 102. An optional administrator computer 112 may be in communication with e-mail listener 104 and/or network 102. In system 100, the computer systems 106, user computers 108, administrator computer 112, e-mail listener 104, and central database 110 may be located at the same location, such as in the same building or computer lab, or could be remote. While the term "remote" is used with reference to the distance between the components of system 100, the term is used in the sense of indicating separation of some sort, rather than in the sense of indicating a large physical distance between the systems. For example, any of the components of system 100 may be physically adjacent or located as part of the same computer system in some network arrangements.

Network 102 may be any type of data communications channel, such as the Internet, an intranet, a LAN, a WAN, an Ethernet network, wireless networks, etc. The Internet or other public network may be particularly useful as network 102 when the individual computer systems 106 and/or the e-mail listener 104 belong to different organizations, as communications between these will be facilitated. Those skilled in the art will recognize, however, that the invention described herein may be implemented utilizing any type of data communications channel.

In one embodiment, computer systems 106 may be organizational computer systems, such as a corporate network. These computer systems 106 are typically protected by a firewall or other type of network security. The firewall prevents unauthorized access from outside parties trying to access computer system 106 through network 102 and also may limit the access of users on user computers 108 to the network 102 and outside computer systems. The computer system 106 provides an internal network used by one or more user computers 108 (i.e., employee personal computers) for internal communication and communication outside the computer system 106 through the firewall (subject to any network security). In an alternative embodiment, computer system 106 may simply be a personal computer with access to network 102, and with no associated user computers 108. In this embodiment, computer system 106 may still have network security, such as a hardware and/or software firewall, or it may have no such (or limited) network security.

In one embodiment, the user computers 108 and/or the computer systems 106 have e-mail capability. In particular, user computers 108 and/or computer systems 106 may have the capability of transmitting an e-mail message to the e-mail listener 104 using the network 102. In this embodiment, a user may use e-mail software to transmit an e-mail or, alternatively, other software may automatically transmit an e-mail upon the occurrence of a particular event. For example, database software located on, say, a user computer 108, could automatically send an e-mail to a specified address (e.g., the e-mail listener 104) when any values within the database are changed by the user.

Computer systems 106 may include optional local databases 114. Local databases 114 serve as databases to be used on a particular computer system 106. In one embodiment, computer systems 106 may have similar local databases 114 such that each accepts user input, such as via user computer 108. One example of a local database 114 is Bugzilla, an open source software defect or bug tracking system. Bugzilla allows users utilizing a wide variety of computer systems 106 to input bugs they have found in a particular piece of software, in one example. Bugzilla also may automatically, after a user updates a record, transmit an e-mail message detailing the update to an e-mail address to be specified.

System 100 may also include a central database 110 for sharing information between multiple users, such as users associated with the plurality of computer systems 106. Central database 110 may be a relational database, and may use any sort of software, such as MySQL. Central database 110 may be located anywhere within system 100, including as a standalone database, as part of the e-mail listener 114, as coexistent with a local database 114, etc., and may be stored on any type of storage device, such as hard drives, volatile memory, etc. In one embodiment, central database 110 is located behind a firewall or other network security so as to protect the information contained within it. When central database 110 is located behind a firewall, access may be limited to protect the safety and the security of the data located within. In this embodiment, many users on user computers 108 and/or computer systems 106 may be prohibited access to reading from or writing to the database. Firewalls associated with computer systems 106 and/or user computers 108 may also prevent users of those systems from accessing a remote site such as central database 110 because of their network security configurations. Most corporate firewalls, for example, prevent employees from using company computers from accessing other computer systems such as central database 110 or other computer systems 106.

E-mail listener 104 may be in communication with central database 110 and network 102. E-mail listener 104 is adapted to receive e-mails from users on user computers 108 and/or computer systems 106. E-mail listener 104 may be a standalone computer system with network connectivity, processing, storage, etc., or e-mail listener 104 may be a program or module executing on another computer such as one of the computer systems 106, or any other configuration. E-mails received by the e-mail listener 104 may be analyzed and, based on the analyzed e-mails, the e-mail listener 104 may make or request changes to central database 110. In one embodiment, users on user computers 108 and/or computer systems 106 that do not have access to central database 110 may transmit e-mails including information about their requested change to the central database 110 to the e-mail listener 104 using a transaction e-mail. A transaction e-mail may be any e-mail that includes an indication of a change to a database, such as local database 114, or a requested change to central database 110. Firewalls and other network security typically allow outgoing e-mails, so even users behind firewalls may usually transmit e-mails to the e-mail listener 104. The e-mail listener 104 may then analyze or otherwise process the e-mails and make any changes to the central database 110. In this way, users behind firewalls may effectively update central database 110 even though their computer systems 106 prohibit their access to the central database 110.

E-mail listener 104 may include a receiving module 116, an analysis module 118, and an update module 120. Receiving module 116 is adapted to receive a transaction e-mail, such as from one of the computer systems 106, via the network 120. Analysis module 118 is adapted to analyze the received transaction e-mail to determine an update to the database. Update module 120 is adapted to update the central database 110 based on the results of the analysis of the received transaction e-mail, and may also be adapted to update the transaction log.

One example of the use of an e-mail listener 104 is illustrated with a Bugzilla project. For this project, a group of users on user computers 108 and/or computer systems 106 may use Bugzilla as their local database 114 to record bugs in, say, a new version of software being tested. When a user enters or changes a record in their local database 114, a transaction e-mail may automatically be created and transmitted to an e-mail listener 104. The e-mail listener 104 may then analyze the transaction e-mail and modify a central database 110 based on the transaction e-mail (and, thus, the user's input). This allows for the input of multiple users to be collected in one central source. The e-mail listener 104 may also update a transaction log, which could be transmitted to the different computer systems 106 so that local databases 114 could be updated. This would allow local databases 114 to be updated to reflect input from other users on other computer systems 106, even though corporate firewalls would have prevented any traditional collaboration.

System 100 may also include an optional administrator computer 112, which may be used to configure and maintain the e-mail listener 104. In one example, the administrator computer 112 may be used to add permitted senders of transaction e-mails, to set permissions, to update the frequency of updating central database 110, to start or stop the e-mail listener 104, or to perform any other task. Similarly, the administrator computer 112 may be used to perform similar tasks on central database 110, such as by communicating via the network 102 or by a direct connection. The administrator computer 112 may, in an alternative embodiment, be the same computer as one of the computer systems 106, user computers 108, e-mail listener 104, etc. In one embodiment, one of the user computers 108 may serve as the administrator computer 112. This may be particularly useful when the central database 110 is part of the same computer system 106 as that of the user computer 108 being used for administration.

Figure 2:
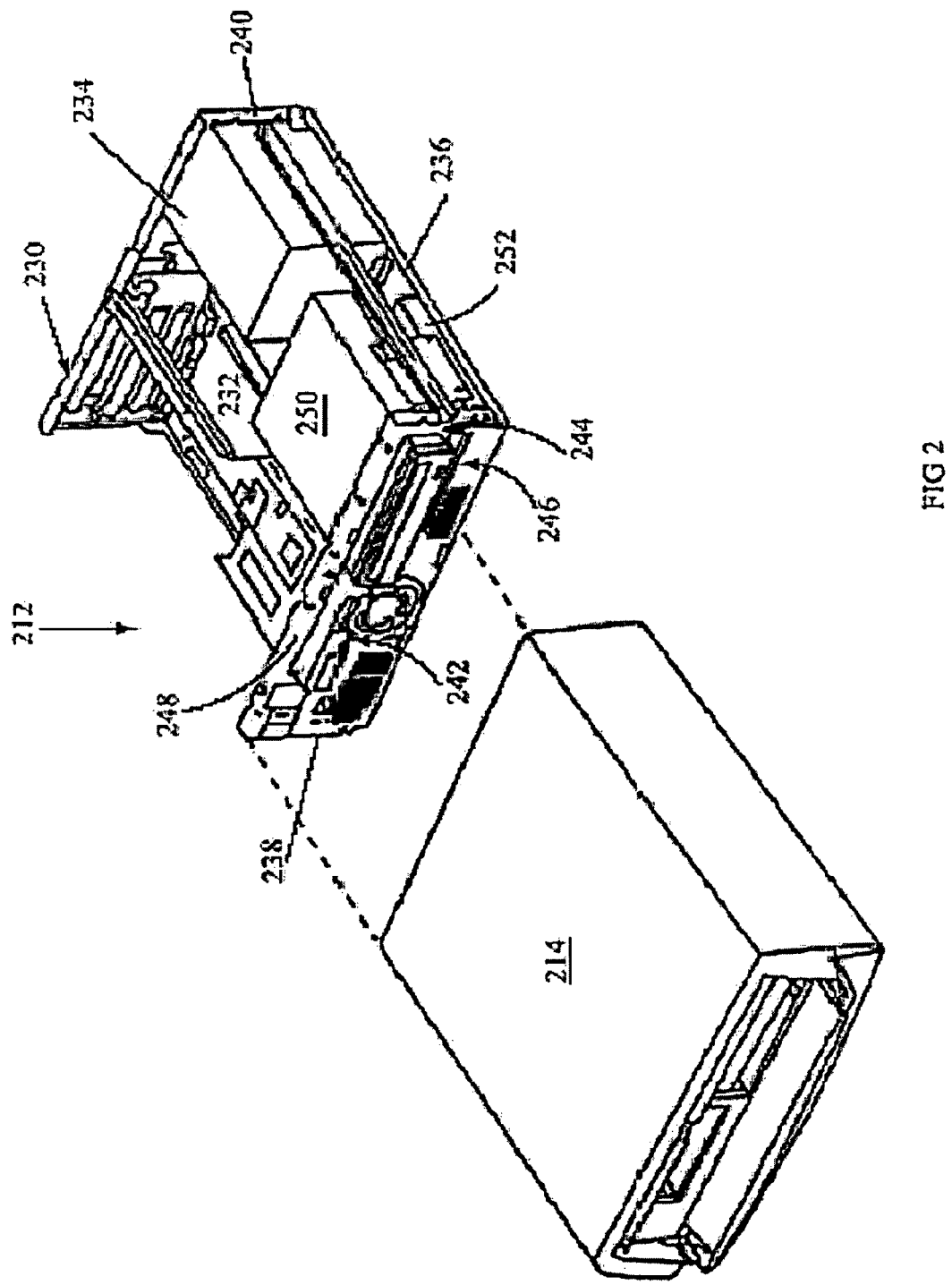
FIG. 2 depicts an exploded perspective view of certain elements of a processing device such as a personal computer, including a chassis, a cover, and a planar board.
Figure 3:
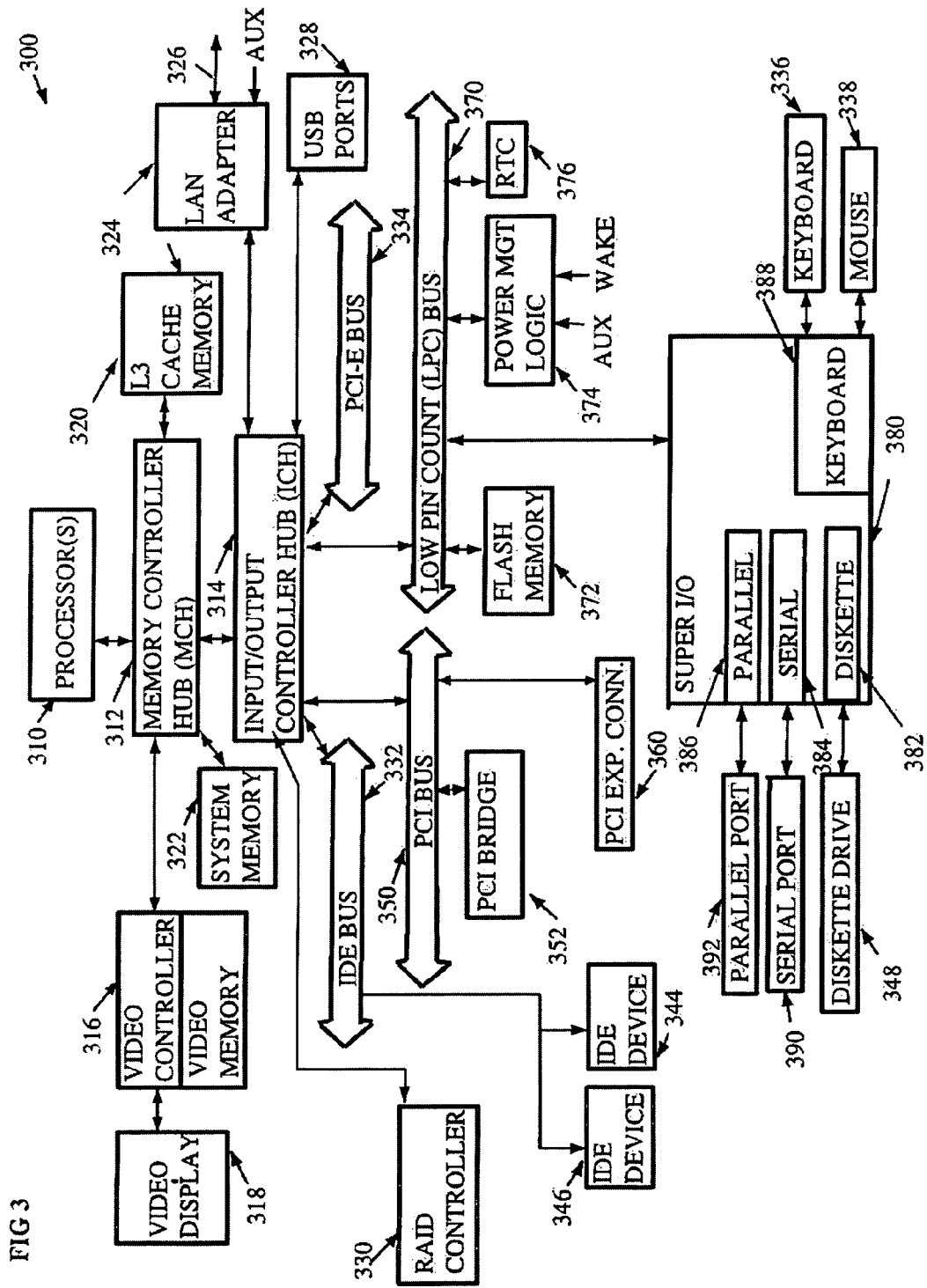
FIG. 3 depicts a block diagram of certain components of the processing device of FIG. 2.

FIGS. 2 and 3 depict one embodiment of a personal computer 212 suitable for use as, for example, an e-mail listener 104, a computer system 106, a user computer 108 or an administrator computer 112. Other possibilities for the personal computer 212, an e-mail listener 104, a computer system 106, a user computer 108 or an administrator computer 112 are possible, including a computer having capabilities other than those ascribed herein to a "personal computer", and possibly beyond those capabilities, and they may, in other embodiments, be any combination of processing devices such as workstations, servers, mainframe computers (such as IBM Corporation's zSeries mainframe), notebook or laptop computers, desktop computers, personal digital assistants (PDAs), or the like.

FIG. 2 depicts an exploded perspective view of certain elements of a personal computer 212 according to one embodiment, including a chassis 230, a cover 214, and a planar board 232. Cover 214 is a decorative outer member that cooperates with a chassis 230 in defining an enclosed, shielded interior volume for receiving electrically powered data processing and storage components to process and store digital data. At least certain of these components may be mounted on a multi-layer planar 232 or motherboard which may be mounted on the chassis 230 and may provide a means for electrically interconnecting the components of the personal computer 212, including those identified above and such other associated elements as floppy disk drives, various forms of direct access storage devices, accessory adapter cards or boards, and the like.

Personal computer 212 may have a power supply 234 that may be actuated by a power switch (not shown). The chassis 230 may have a base indicated at 236, a front panel indicated at 238, and a rear panel indicated at 240. The front panel 238 may define at least one open bay for receiving a data storage device such as a disk drive for magnetic or optical disks, a tape backup drive, or the like.

In the illustrated form, a pair of upper bays 242, 244 and a lower bay 246 are provided. One of the upper bays 242 may be adapted to receive peripheral drives of a first size (such as those known as 3.5 inch drives) while the other 244 may be adapted to receive drives of a different size (such as a CD-ROM or DVD-ROM drive) while the lower bay may be adapted to receive another drive. One floppy disk drive indicated at 248 may be a removable medium direct access storage device (DASD) capable of receiving a diskette inserted there into and using the diskette to receive, store and deliver data as is generally known. One CD-ROM drive indicated at 250 is a removable medium DASD capable of receiving a compact disc inserted there into and using the disc to deliver data as is generally known. One hard disk drive is indicated at 252 and is a fixed medium DASD capable of storing and delivering data as is generally known.

Referring now to FIG. 3, there is shown a block diagram 300 of certain components of the personal computer 212 of FIG. 2. The components of FIG. 3 comprise components mounted on the planar 232 or other hardware of the personal computer 212. Connected to the planar 232 is the system CPUs or processor(s) 310, which may be connected directly to a memory controller hub (MCH) 312. As one example, the system-processor(s) 310 could be an Intel Pentium processor, Cyrix 586-P75 processor or Advanced Micro Devices 8486 processor or any other suitable processor.

MCH 312 and input-output (I/O) controller hub (ICH) 314 represent part of the personal computer's 212 core logic chipset, facilitating access to/from processor(s) 310 from/to memory devices and I/O devices, respectively. More specifically, MCH 312 may provide access to system memory 322 and level three (L3) cache memory 320. In many such embodiments, level one (L1) and level two (L2) cache are incorporated into each processor of processor(s) 310.

MCH 312 may also include a special bus adapted for direct memory access (DMA) by a video controller. In some embodiments, the special bus may be an accelerated graphics port (AGP). The AGP may be a high-speed port that is designed for the display adapter 316, a video card typically including a video controller and video memory. The AGP may provide a direct connection between the card 316 and system memory 322. AGP may use, e.g., a 32-bit bus to provide data transfer rates such as 264 Megabytes per second, 528 Megabytes per second, one Gigabyte per second, and two Gigabytes per second. In other embodiments, a peripheral component interconnect (PCI) bus such as a PCI-E bus may be implemented for video display 318.

System memory 322 may include random access memory (RAM) such as double data rate (DDR) synchronous dynamic random access memory (SDRAM). System memory 322 may be composed of one or more memory modules and MCH 312 may include a memory controller with logic for mapping addresses to and from processor(s) 310 to particular areas of system memory 322 and a cache controller operatively coupled with L3 cache memory 320.

Input/Output Controller Hub (ICH) 314 may be designed to coordinate communications with various I/O devices. In the depicted embodiment, ICH 314 couples with local area network (LAN) adapter 324, universal serial bus (USB) ports 328, redundant array of independent disks (RAID) controllers 330, integrated drive electronics (IDE) bus 332, PCI Express (PCI-E) bus 334, PCI bus 350, and low pin count (LPC) bus 370. LAN adapter 324 may be coupled to either the PCI bus 350 or directly to ICH 314 to facilitate communication (i.e., transmit/receive data) with a remote computer or server over a LAN via a connection or link 326. LAN adapter 324 may be a card to be plugged in personal computer 212 or a LAN connection embedded on the planar 232. LAN adapter 324 may also be known as a network interface card (NIC).

LAN adapter 324 may include a Media Access Controller (MAC), which serves as an interface between a shared data path (e.g., a media independent interface as described below) and the ICH 314. The MAC may perform a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception. The MAC may be, for example, an Intel 82557 chip.

LAN adapter 324 may further comprise a physical layer and a media independent interface (MII), which is a local bus between the MAC and the physical layer. The MII is a specification of signals and protocols, which formalizes the interfacing of a 10/100/1000 Mbps Ethernet MAC, for example, to the underlying physical layer. The physical layer receives parallel data from the MII local bus and converts it to serial data for transmission over link 326. The physical layer may be, for example, an Integrated Circuits Systems 1890 chip. The physical layer includes auto-negotiation logic that, in one embodiment, determines the capabilities of a server, advertises its own capabilities to the server, and establishes a connection with the server using the highest performance common connection technology. In the depicted embodiment, personal computer 212 also includes wake-on-LAN functionality incorporated into LAN adapter 324.

Personal computer 212 may include one or more USB ports 328, which are hardware interfaces for peripherals such as the keyboard, mouse, joystick, scanner, printer, telephony devices, hard drives, compact disk (CD) drives, digital video disk (DVD) drives, and the like. USB ports 328 also typically support MPEG-1 and MPEG-2 digital video. A USB 1.1 protocol for USB ports 328 has a maximum bandwidth of 12 Megabits per second (equivalent to 1.5 Megabytes per second), and up to 127 devices can be attached. Fast devices can use the full bandwidth, while lower-speed ones can transfer data using a 1.5 Megabits per second subchannel. A USB 2.0 protocol, widely known as Hi-Speed USB, increases capacity to 480 Megabits per second. Further, USB ports 328 support hot swapping, which allows peripherals to be plugged in and unplugged without turning the system off.

Personal computer 212 may include a RAID controller 330, which is a controller for a disk subsystem that is used to increase performance or provide fault tolerance. More specifically, RAID controller 330 couples with a set of two or more ordinary hard disks and improves performance by disk striping, which interleaves bytes or groups of bytes across multiple drives, so more than one disk is reading and writing simultaneously. RAID controller 330 adds fault tolerance by mirroring or parity. Mirroring is 100% duplication of the data on two drives (RAID 1), and parity is used (RAID 3 and 5) to calculate the data in two drives and store the results on a third: a bit from drive 1 is XOR'd with a bit from drive 2, and the result bit is stored on drive 3. A failed drive can be hot swapped with a new one, and the RAID controller automatically rebuilds the lost data from backups maintained on other drives. In addition, RAID systems may be built using a spare drive (hot spare) ready and waiting to be the replacement for a drive that fails.

IDE bus 332 and PCI-E bus 334 may be incorporated to facilitate connection of additional I/O devices with ICH 314. IDE bus 332 is a type of hardware interface widely used to connect hard disks, CD-ROMs and tape drives to a PC. IDE bus 332 provides for the attachment for hard disk drive 344 and CD-ROM drive 346. PCI-E bus 334 is a high-speed peripheral interconnect. PCI-E bus is designed to match the higher speeds of CPUs and can accommodate Gigabit and 10 Gigabit Ethernet and evens support chip-to-chip transfers. Rather than the shared, parallel bus structure of PCI, PCI-E bus 334 provides a high-speed, switched architecture. Each PCI Express link is a serial communications channel made up of two differential wire pairs that provide 2.5 Gigabits per second in each direction. Up to 32 of these "lanes" may be combined in x2, x4, x8, x16 and x32 configurations, creating a parallel interface of independently controlled serial links. The bandwidth of the switch backplane determines the total capacity of PCI-E bus 334.

PCI bus 350 may couple a PCI bridge 352 to facilitate the connection of additional PCI devices and a PCI expansion connector 360 to facilitate expansion of the PCI bus 350 so even more peripheral devices can communicate with ICH 314 via PCI bus compatible peripheral cards.

Attached to the LPC 370 may be a flash memory (FM) module or chip 372, a power management logic 374, and a real-time clock (RTC) 376, and a multi-function or super I/O controller 380. Flash memory module 372 contains microcode that personal computer 212 will execute on power on. The flash memory 372 may be a non-volatile memory module or chip.

Power management logic 374 allows for changing between various power states (e.g., off, suspend and normal operating states). The circuitry is supplied with auxiliary power (AUX), or standby power, from the power supply 234 (as shown in FIG. 23) when the personal computer 212 is in the off state so that it can monitor events that cause the personal computer 212 to turn on. For example, the circuitry may also include a timer that is configurable by a user to expire after a predetermined period of time, often referred to, as a time to power on function. When the timer expires, the circuitry such as a service processor may cause the personal computer 212 to change from the off state to the normal operating state.

The real-time clock (RTC) 376 may be used for time of day calculations. Super I/O controller 380 may include functionality such as, for example, a National Semiconductor PC87307. The super I/O controller 380 may contain a variety of I/O adapters and other components such as the diskette adapter 382, serial adapter 384, a parallel adapter 386 and keyboard controller 388. The diskette adapter 382 provides the interface to the diskette drive 348. The serial adapter 384 has an external port connector, serial port 390, for attachment of external devices such as modems (not shown). The parallel adapter 386 has an external port connector, parallel port 392, for attachment of external devices such as printers (not shown). The keyboard controller 388 is the interface for the connectors, keyboard 336 and mouse 338.

Figure 4:
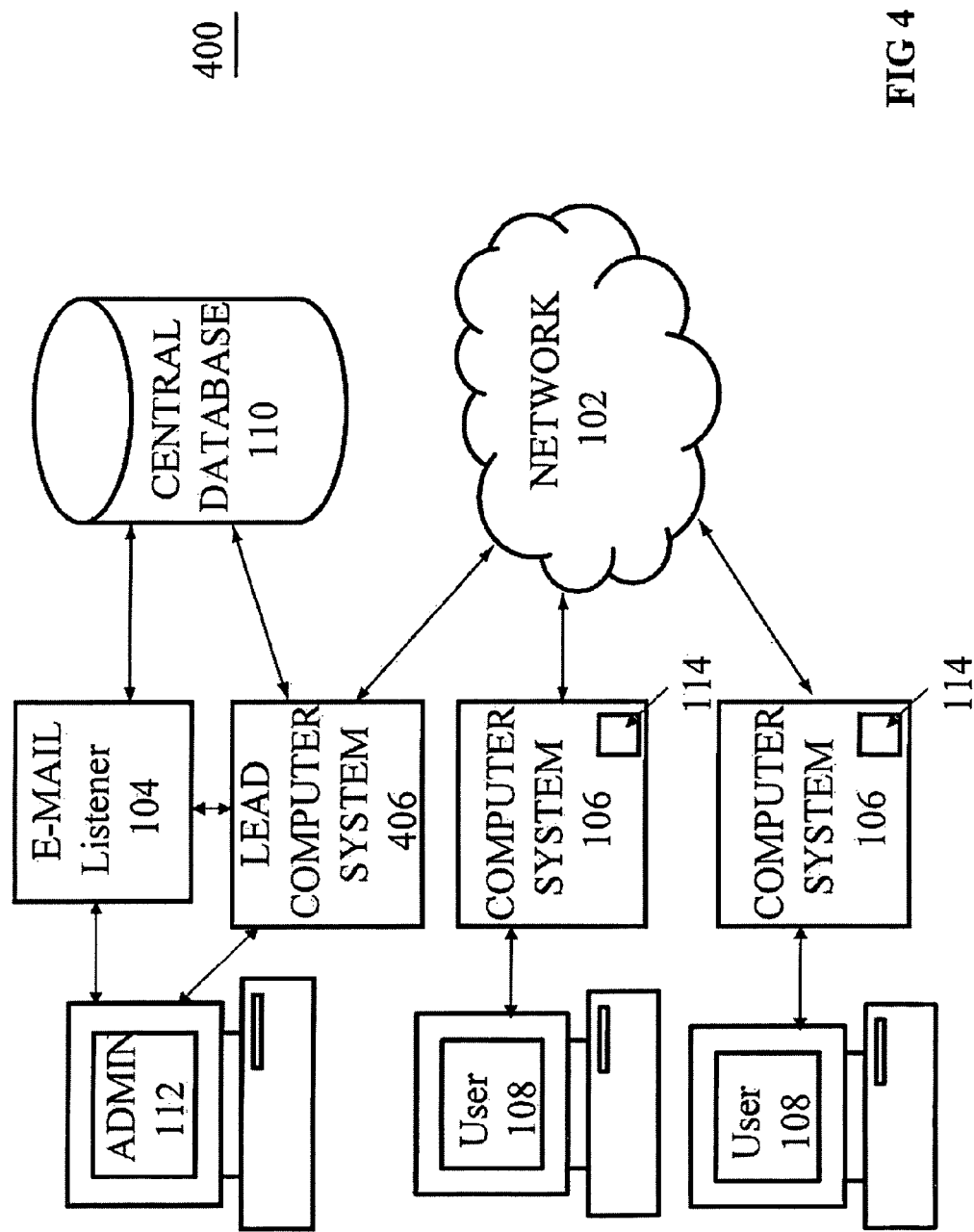
FIG. 4 depicts an environment for a system for synchronizing a database on a network according to an alternative embodiment.

Turning now to FIG. 4, an environment for a system for synchronizing a database on a network according to an alternative embodiment is depicted. System 400 differs from that of system 100 in that the e-mail listener 104, central database 110, and the administrator computer 112 are located "behind" one of the computer systems, lead computer system 406. In this embodiment, the e-mail listener 104, central database 110 and the administrator computer 112 are located behind the firewall of lead computer system 406, making it difficult for users associated with other computer systems 106 to access central database 110. E-mails transmitted from users associated with other computer systems 106 may still be received, however, by the e-mail listener 104 via network 102 after going through the firewall of lead computer system 406. In the depicted embodiment, lead computer system 406 has no local database 114 (unlike the other depicted computer systems 106) as the central database 110 serves as its database. In an alternative embodiment, lead computer system 406 may have a separate local database 114 while the central database 110 is still located behind its firewall.

Figure 5:
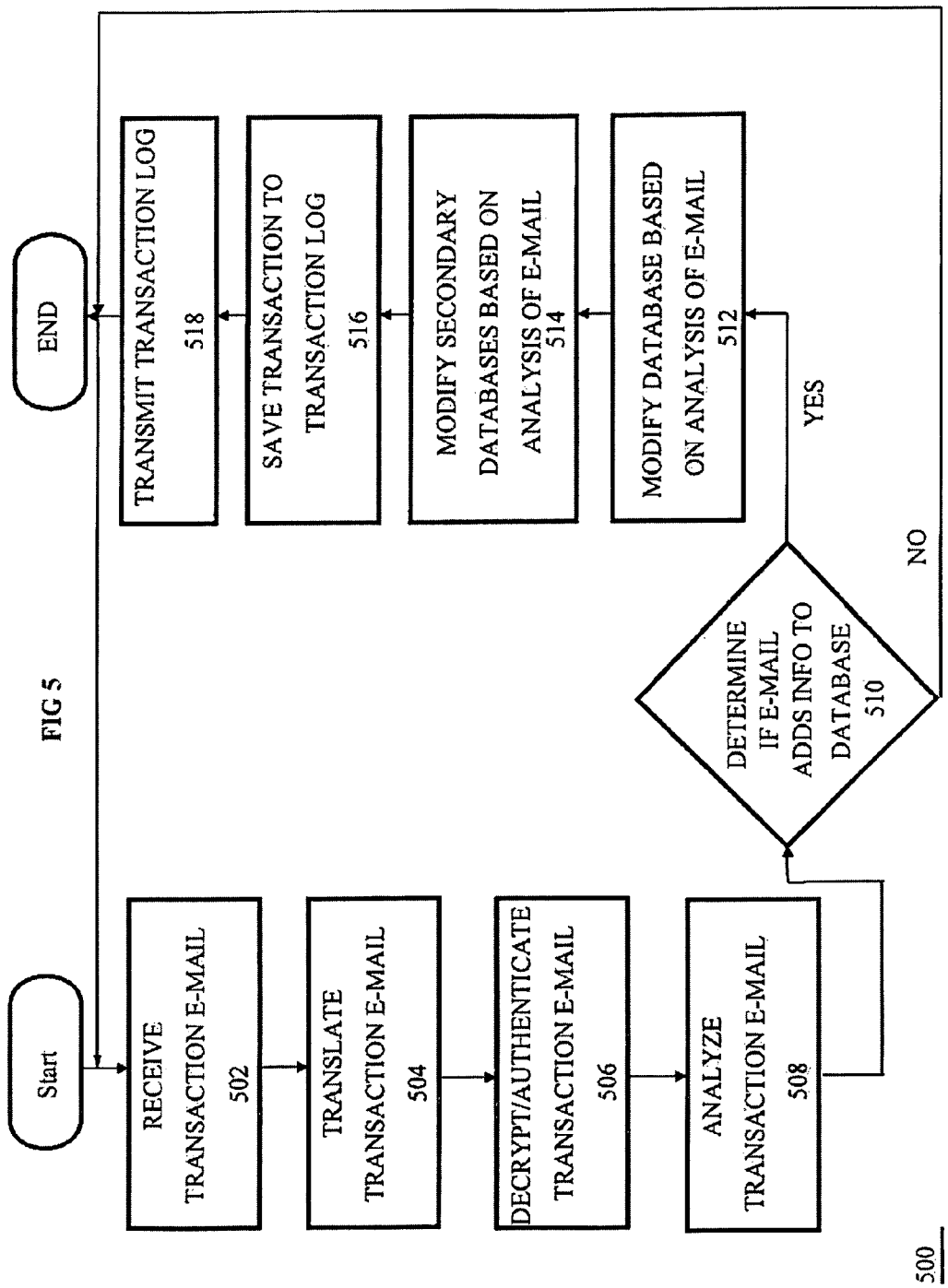
FIG. 5 depicts an example of a flow chart for receiving transaction e-mails and modifying a database according to one embodiment.

FIG. 5 depicts an example of a flow chart 500 for receiving transaction e-mails and modifying a database according to one embodiment. The method of flow chart 500 may be performed, in one embodiment, by the e-mail listener 104. Flow chart 500 begins with element 502, receiving a transaction e-mail. In this element, a transaction e-mail is received via network 102, such as from a computer system 106. An e-mail address may be designated for e-mail listener 104 so that any e-mails addressed to that address will be received by e-mail listener 104.

In one embodiment, transaction e-mails may be identified by a defined string of characters (e.g., "bug") in the subject line of the e-mail. In this embodiment, only e-mails with this defined string are treated as transaction e-mails and processed. This helps ensure that only appropriate e-mails are processed by the function of flowchart 500, eliminating "spam" or other unwanted e-mail. Alternatively, the defined string of characters could be within the text of the e-mail, in an attachment, or any other means may be used to identify the e-mail as a transaction e-mail.

In optional element 504, the transaction e-mail is translated. In one example, the text of a transaction e-mail may be translated from one human language to another using machine-based translation (e.g., converting from Japanese to English). This option facilitates collaboration between personnel who speak different languages. In another example, a computer language or format translation may be performed. In this embodiment, the text of a particular transaction e-mail may be parsed from a machine-readable language to a language compatible with the e-mail listener 104.

In optional element 506, the transaction e-mail may be decrypted and/or authenticated in element 506. If a transaction e-mail is encrypted before transmission for security reasons, the e-mail may be decrypted in element 506 so that it may be read. In another embodiment, the transaction e-mail may be authenticated via a digital signature or other authentication methodology.

The transaction e-mail may be read and analyzed or otherwise processed in element 508 so that later steps may be performed. In on embodiment, the transaction e-mail is analyzed to determine the changes performed by the user whose actions initiated the e-mail. The changes performed by the user may be a new or modified entry in a local database 114.

Flowchart 500 continues to decision block 510, where it is determined whether the transaction e-mail, based on the analysis of element 508, adds new information to the database. E-mail listener 104 may have to access central database 110 to determine whether new information is added or the e-mail listener 104 may have sufficient local records (e.g., a history of transactions, a transaction log, etc.) to make such a determination. In an alternative embodiment, decision block 510 is not necessary and it is simply assumed that all transaction e-mails add value or information and the appropriate command should be sent to the central database 110. This embodiment is functionally equivalent to the answer of decision block 510 always being "yes".

If it determined that the transaction identified in the transaction e-mail does add information to the database (or if decision block 510 is simply not performed), the flowchart 500 continues to element 512, modifying database based on the analysis of the transaction e-mail. In one embodiment, element 512 may be accomplished transmitting a command to central database 110 to modify the information within, where the command is based on the particulars of the transaction. For example, if the transaction e-mail indicated that a user identified a failure in a particular piece of code, the command to central database 110 would request modifying the entry for that particular piece of code in the central database 110 to reflect the failure. In optional element 514, other databases may similarly be modified. This may be useful to help create a backup database to central database 110 or to create local, updated databases (such as local databases 114) for each computer system 106 that mirror the updated central database 110.

Flowchart 500 continues to element 516, where an indication of the transaction of the transaction e-mail is saved to a transaction log. The indication may include a summary of the transaction, a complete description of the transaction, all or part of the transaction e-mail, a record of steps performed by the e-mail listener 104, etc., or any combination of these items. The transaction log may serve as a backup device, as it may be replayed in order to recreate a database as it looked at a certain time. For example, a transaction log for the last two days could be used to update a version of a database from two days ago to the current state.

After element 516, flowchart 500 continues to optional element 518, transmitting transaction log. The transaction log may be transmitted to any place and in any form (e.g., via e-mail, as an e-mail attachment, etc.). Destinations for the transaction log include computer systems 106, backup locations, a duplicate or backup database to central database 110, etc. In one example, the transaction log may be transmitted to the computer systems 106 so that changes to central database 110 can be recreated locally (such as on local databases 114) by replaying the transaction log. The transaction log may be transmitted via e-mail (either as text or as an attachment) to the local computer systems 106 so that it may easily penetrate the firewall. In another example, the transaction log may be transmitted to storage so that if central database 110 is lost it may more easily be recreated using and replaying the transaction log. After optional element 518, flow chart 500 terminates or returns to before element 502 and waits for the next transaction e-mail.

Figure 6:
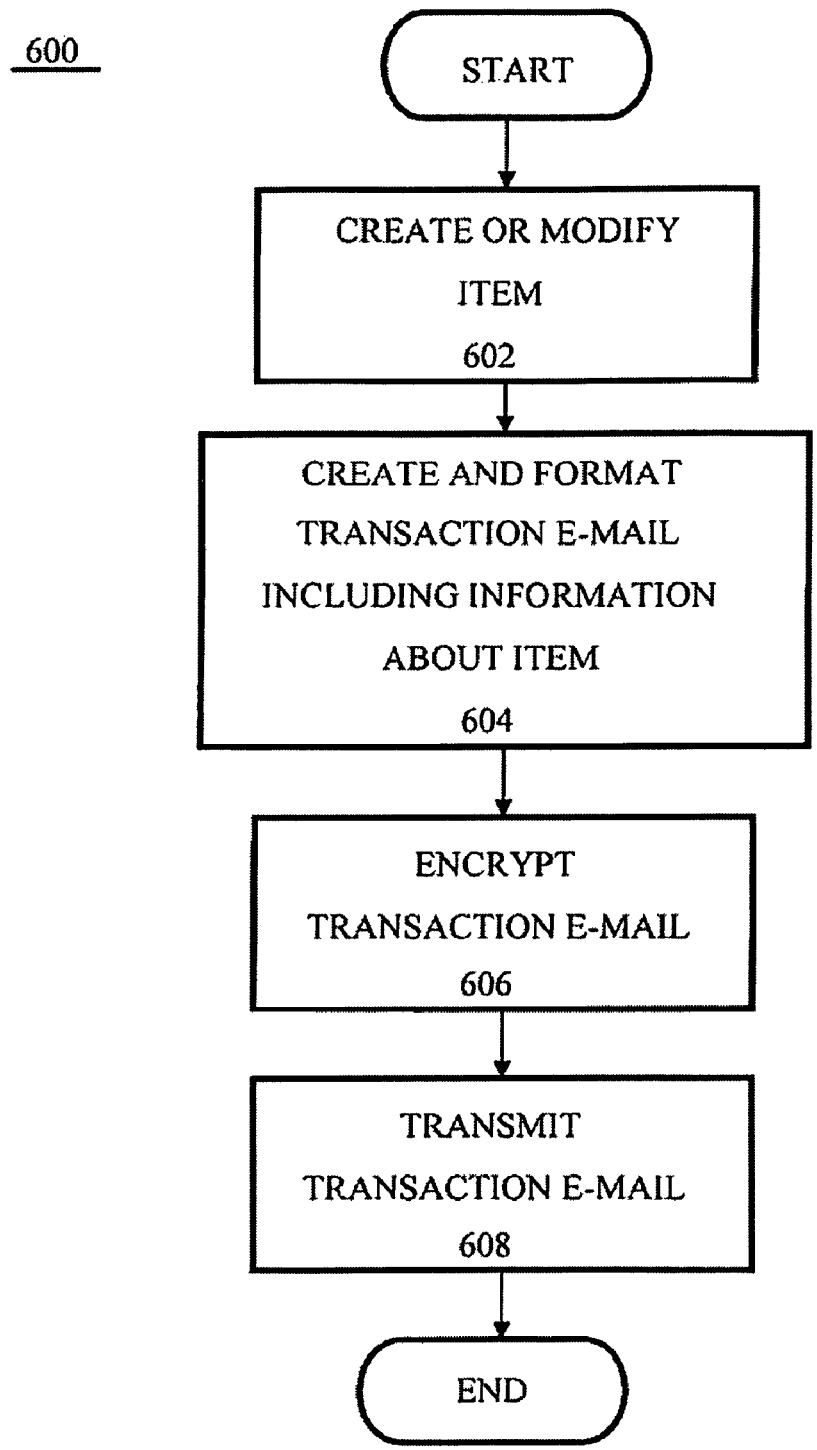
FIG. 6 depicts an example of a flow chart for a user on a computer system to create or modify an item in a database according to one embodiment.

FIG. 6 depicts an example of a flow chart 600 for a user to create or modify an item in a database according to one embodiment. The function of flow chart 600 may be performed on a user computer 108 or computer system 106 that is being used by a particular user so that a transaction e-mail will ultimately be transmitted. Flow chart 600 begins with element 602, creating or modifying an item. In this element, a user might manually create an item for a database or modify an existing item in a database such as local database 114. A user could, for example, modify a status flag for a function (represented by an element in a database) from "passed" to "fail" in the event that an error is noticed. In another example, a user could input information into a local database 114. In an alternative embodiment, the item in the database may be automatically modified based upon a particular event or based on an action of the user. In this example, a database entry could be modified automatically when a particular failure occurred, when a test passed, etc., without human interaction.

Flow chart 600 continues to element 604, creating and formatting transaction e-mail relating to the item that was created or modified in the database in element 602. In element 604, a transaction e-mail is created based on the database entry that was created or modified. The transactional e-mail may optionally be formatted for the e-mail listener 104, such as by adding an identifying character string (to mark it as a transactional e-mail) or to make the e-mail more suited to be machine-readable. Any format or language for the transaction e-mail is possible. In element 606, the e-mail is optionally encrypted if it is desired to have increased security of the transmission. The transaction e-mail is transmitted via network 102, after which the flow chart terminates.

Figure 7:
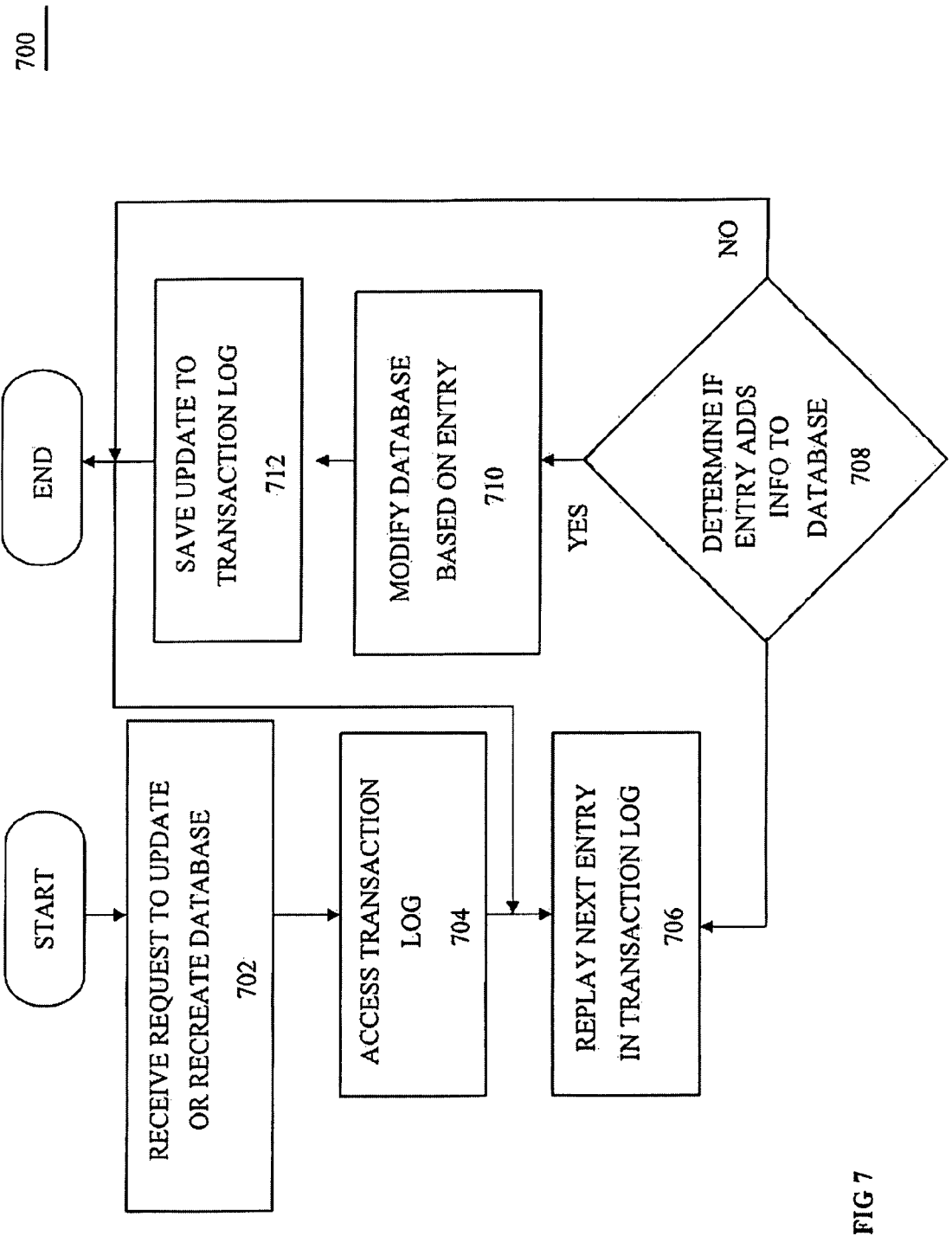
FIG. 7 depicts an example of a flow chart for creating a duplicate database according to one embodiment.

FIG. 7 depicts an example of a flow chart for creating a duplicate database according to one embodiment. The function of flow chart 700 may be performed by the e-mail listener 104, administrator computer 112, any of the computer systems 106, or any computer or computer system. Flow chart 700 begins with optional element 702, receiving a request to update or recreate a database. The request to recreate a database may come from a user on a user computer 108 or computer system 106, from an administrator on an administrator computer 112, may be automatically generated, etc. The described method of creating a duplicate database may be used to create a backup to central database 110, to restore central database 110, to update one of the local databases 114, or any other database.

Flow chart 700 continues with element 704, accessing the transaction log. In this element, the transaction log is accessed wherever it is located, such as on a remote database, at a remote computer, or on the same computer system. The next entry of the transaction log is replayed in element 706. In one embodiment, the next entry starts as simply the first entry of the transaction log. In an alternative embodiment, the next entry may be the first entry after a particular time (e.g., the last update). This option would be available if entries in the transaction log include some type of time tag.

Flow chart 700 continues to optional decision block 708, where it is determined whether the transaction log entry adds new information to the database being updated. The computer executing flow chart 700 may have to access the database to be updated in order to determine whether new information is added. In an alternative embodiment, decision block 708 is not necessary and it is simply assumed that all entries in the transaction log add value or information and the appropriate command will be sent to the database. This embodiment is functionally equivalent to the answer of decision block 708 always being "yes".

Flow chart 700 continues to element 710, where the database is modified based on the entry in the transaction log. After the database is modified, the transaction log is optionally updated in element 712 to reflect that an update to the particular database was made, after which the flow chart terminates. Element 712 allows for a history of updates to various databases to be retained so that an administrator or others can ascertain the current state of different databases.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for synchronizing a database on a network, particularly where inputs to the database derive from computer systems behind a firewall. It is understood that the form of the invention shown and described in the detailed description and the drawings are to be taken merely as examples. It is intended that the following claims be interpreted broadly to embrace all the variations of the example embodiments disclosed.

What is claimed is:

1. A data processing system for synchronizing a database on a network, the system comprising:
    a plurality of computer systems each having one or more processors in communication with the network and a local database, the computer systems being capable of transmitting a transaction e-mail, the transaction e-mail comprising an indication of a modification by the user to a local database of the user's computer system;
    a central database in communication with the network and having a firewall that prevents access to the central database by users of the plurality of computer systems; and
    an e-mail listener in communication with the network, the e-mail listener being capable of receiving a transaction e-mail transmitted from one of the plurality of computer systems via the network, wherein the e-mail listener analyzes received transaction e-mail by determining if the transaction e-mail contains a pre-defined string of characters associated with the central database and, in response to determining that the pre-defined string of characters is present, determining whether the transaction e-mail adds information to the central database; and
    wherein the e-mail listener modifies the central database based on the analysis of the transaction e-mail to synchronize the central database with the local database, wherein:
    the user's computer system, prior to the transmitting, modifying of a record in the local database and creating the transaction email;
    the e-mail listener determining, in response to receiving the transaction e-mail, whether the transaction e-mail is written in a second language different from a first language of entries in the central database, and translating the transaction e-mail to the first language if the transaction e-mail is written in the second language;
    the e-mail listener updating a transaction log based on the analysis of the transaction e-mail and transmitting the transaction log to the user's computer system through a server computer system firewall; and
    the user's computer system receiving the transaction log and modifying the local database based on the receiving of the transaction log.

2. The system of claim 1, wherein at least one of the plurality of computer systems is protected by a firewall.

3. The system of claim 1, wherein the e-mail listener is capable of updating a transaction log based on the received e-mail.

4. The system of claim 1, wherein at least one of the plurality of computer systems is a personal digital assistant.

5. The system of claim 1, further comprising an administrator computer in communication with the e-mail listener, the administrator computer being adapted to adjust settings of the e-mail listener.

6. A computer-implemented method for synchronizing a central database on a network, the method comprising:
    modifying, by a user's computer system, a record in a local database associated with the user's computer system;
    creating, by the user's computer system, a transaction e-mail;
    by an e-mail listener executing on one or more processors of a server computer system, receiving the transaction e-mail from the user's computer system through a firewall that prevents access to a central database by the user's computer system, the transaction e-mail comprising an indication of the modification to the local database;
    analyzing the transaction e-mail, by the e-mail listener, by determining if the transaction e-mail contains a pre-defined string of characters associated with the central database and, in response to determining that the pre-defined string of characters is not present, deleting the transaction e-mail;
    in response to determining that the pre-defined string of characters is present in the transaction e-mail, determining, by the e-mail listener, whether the transaction e-mail adds information to the central database;

in response to determining that the transaction e-mail adds information to the central database, modifying, by the e-mail listener, a central database based on the analysis of the transaction e-mail to synchronize the central database with the local database, wherein modifying the central database comprises determining, by the e-mail listener, whether the transaction e-mail is written in a second language different from a first language of entries in the central database, and translating, by the e-mail listener, the transaction e-mail to the first language if the transaction e-mail is written in the second language;

updating, by the e-mail listener, a transaction log based on the analysis of the transaction e-mail and transmitting, by the e-mail listener, the transaction log to the user's computer system through a server computer system firewall;

receiving, by the user's computer system, the transaction log; and modifying, by the user's computer system, the local database subsequent to, and based on, the received transaction log.

7. The method of claim 6, further comprising updating a transaction log based on the analysis of the transaction e-mail.

8. The method of claim 6, further comprising:
updating a transaction log based on the analysis of the transaction e-mail;
transmitting the transaction log;
receiving the transaction log at a computer system; and
modifying the local database based on the transaction log.

9. The method of claim 6, further comprising before analyzing the transaction e-mail, decrypting the transaction e-mail.

10. The method of claim 6, further comprising before analyzing the transaction e-mail, authenticating the transaction e-mail.

11. The method of claim 6, further comprising transmitting the transaction log.

12. The method of claim 6, further comprising modifying a second database based on the analysis of the transaction e-mail.

13. A machine-accessible medium of a storage device containing instructions effective, when executing in a data processing system, to cause said data processing system to perform operations comprising:
modifying, by a user's computer system, a record in a local database associated with the user's computer system;
creating, by the user's computer system, a transaction e-mail;
by an e-mail listener executing on one or more processors of a server computer system, receiving the transaction e-mail from the user's computer system through a firewall that prevents access to a central database by the user's computer system, the transaction e-mail comprising an indication of the modification to the local database;

analyzing the transaction e-mail, by the e-mail listener, by determining if the transaction e-mail contains a pre-defined string of characters associated with the central database and, in response to determining that the pre-defined string of characters is not present, deleting the transaction e-mail;

in response to determining that the pre-defined string of characters is present in the transaction e-mail, determining, by the e-mail listener, whether the transaction e-mail adds information to the central database;

in response to determining that the transaction e-mail adds information to the central database, modifying by the e-mail listener the central database based on the analysis of the transaction e-mail to synchronize the central database with the local database, wherein modifying the central database comprises determining, by the e-mail listener, whether the transaction e-mail is written in a second language different from a first language of entries in the central database, and translating, by the e-mail listener, the transaction e-mail to the first language if the transaction e-mail is written in the second language;

updating, by the e-mail listener, a transaction log based on the analysis of the transaction e-mail and transmitting, by the e-mail listener, the transaction log to the user's computer system through a server computer system firewall;

receiving, by the user's computer system, the transaction log; and modifying, by the user's computer system, the local database subsequent to, and based on, the received transaction log.

14. The machine-accessible medium of claim 13 wherein the operations further comprise decrypting the transaction e-mail.

15. The machine-accessible medium of claim 13 wherein the operations further comprise authenticating the transaction e-mail.

16. The machine-accessible medium of claim 13 wherein the operations further comprise transmitting the transaction log.

17. The machine-accessible medium of claim 13 wherein the operations further comprise modifying a second database based on the analysis of the transaction e-mail.

* * * * *